United States Patent

Voit et al.

[11] Patent Number: 5,287,951
[45] Date of Patent: Feb. 22, 1994

[54] HYDRAULICALLY ACTUABLE RELEASER FOR A MOTOR VEHICLE FRICTION CLUTCH

[75] Inventors: Herbert Voit, Schweinfurt; Karl Müller, Poppenhausen; Wolfgang Grosspietsch, Schweinfurt; Gottfried Mader, Ebelsbach, all of Fed. Rep. of Germany

[73] Assignee: Fichtel & Sachs AG, Schweinfurt, Fed. Rep. of Germany

[21] Appl. No.: 938,373

[22] Filed: Aug. 31, 1992

[30] Foreign Application Priority Data

Sep. 4, 1991 [DE] Fed. Rep. of Germany ....... 4129370

[51] Int. Cl.⁵ ..................... F16D 25/08; F16D 25/12; F16J 15/32; F16J 15/56
[52] U.S. Cl. ............................. 192/85 CA; 92/165 R; 192/91 A; 192/98; 277/188 A
[58] Field of Search ................. 192/91 A, 85 CA, 98, 192/113 P; 92/107, 108, 109, 165 R; 277/188 A, 209, 165

[56] References Cited

U.S. PATENT DOCUMENTS

| 4,620,625 | 11/1986 | Ladin | 92/109 X |
| 4,821,627 | 4/1989 | Leigh-Monstevens | 192/91 A X |
| 4,827,834 | 5/1989 | Leigh-Monstevens | 192/85 CA X |
| 5,113,991 | 5/1992 | Kajitani et al. | 192/85 CA X |

FOREIGN PATENT DOCUMENTS

| 0092823 | 11/1983 | European Pat. Off. |
| 8422431.2 | 11/1984 | Fed. Rep. of Germany |
| 2005382A | 4/1979 | United Kingdom |

Primary Examiner—Rodney H. Bonck
Attorney, Agent, or Firm—Brumbaugh, Graves, Donohue & Raymond

[57] ABSTRACT

The invention relates to a hydraulically actuable releaser with an annular piston. The supporting ring co-operating with the annular piston and the groove sealing ring co-operating with the supporting ring have, at least in their radially outer region facing one another, an encircling supporting shoulder on the supporting ring and an encircling recess on the groove sealing ring. This measure prevents the groove sealing ring from being pressed into a possible gap between supporting ring and the external wall of the housing under pressure loading.

6 Claims, 5 Drawing Sheets

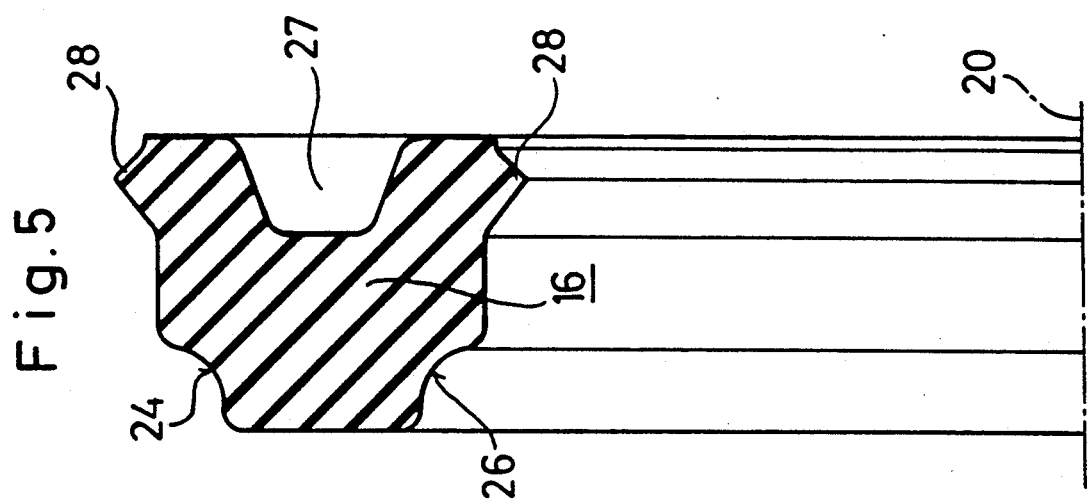
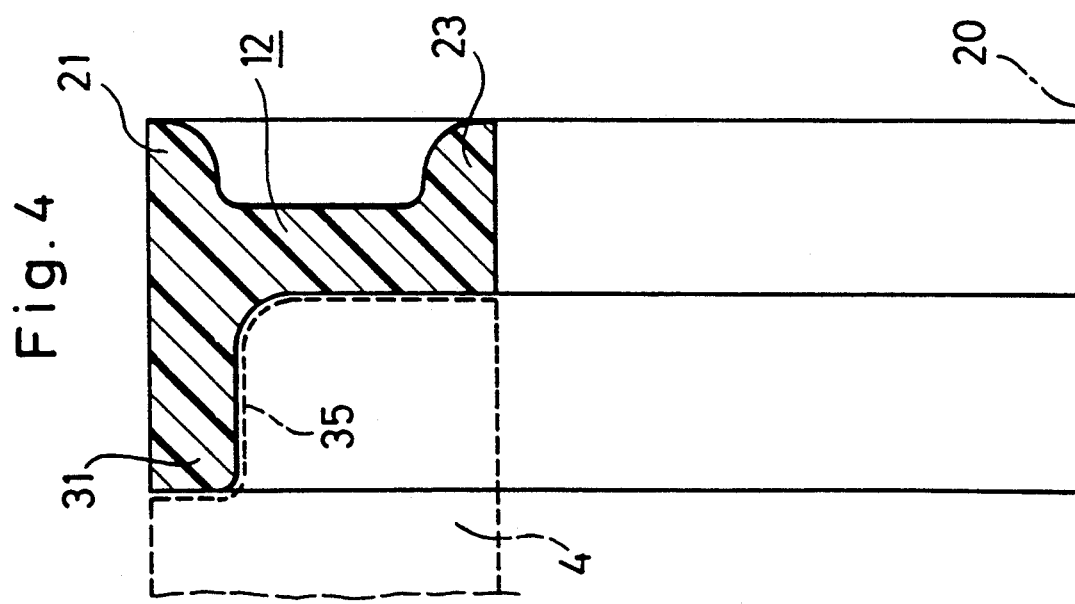

HYDRAULICALLY ACTUABLE RELEASER FOR A MOTOR VEHICLE FRICTION CLUTCH

BACKGROUND OF THE INVENTION

The invention relates to a hydraulically actuable releaser for a motor vehicle friction clutch.

A hydraulically actuable releaser for a motor vehicle friction clutch is known from DE-U-84 22 431. The releaser comprises an annular cylindrical slave cylinder of which the casing contains a pressure chamber which is limited radially inwardly by an internal wall and radially outwardly by an external wall extending at a radial distance from the internal wall. Between the internal wall and the external wall there extends an axially movable annular piston which carries a release bearing at its end axially remote from the pressure chamber and adjoins a groove sealing ring via a supporting ring at its end close to the pressure chamber. The groove sealing ring has, on its side axially remote from the annular piston in the region of its internal periphery and its external periphery, sealing lips which enclose an annular groove between themselves and, for sealing the pressure chamber, rest on the internal wall and the external wall.

With the known releaser, the supporting ring is to fill the space between internal wall and external wall without gaps so that the groove sealing ring consisting of elastic material cannot be urged into a gap under pressure loading.

SUMMARY OF THE INVENTION

It is an object of the invention to improve a releaser of the above-mentioned type such that friction and wear at the sealing elements and the guides are limited even at high pressures and under high thermal stress such that a prolonged service life is achieved.

According to the invention the hydraulically actuable releaser comprises an annular cylindrical slave cylinder, of which the casing contains a pressure chamber which is limited radially inwardly by an internal wall and radially outwardly by an external wall extending at a radial distance from the internal wall, an axially movable annular piston extending between the internal wall and the external wall, a release bearing at an end of the annular piston axially remote from the pressure chamber, a groove sealing ring at an end of the annular piston facing the pressure chamber, wherein the groove sealing ring has, on its side axially remote from the annular piston in the region of its internal periphery and its external periphery sealing lips which enclose an annular groove between themselves and, for sealing the pressure chamber, rest on the internal wall and the external wall and a supporting ring arranged axially between the annular piston and the groove sealing ring. The casing including its internal wall and its external wall is produced from plastics material and the supporting ring has, on the side facing the groove sealing ring in the region of the external periphery, an annular supporting shoulder which projects to the groove sealing ring and engages in a corresponding annular recess on the side of the groove sealing ring adjacent to the annular piston.

Owing to the use of plastics material for the casing of the slave cylinder, the weight of the entire construction may be kept very low and production, for example by injection moulding, requires no subsequent machining, at least in the region of the seal.

The supporting shoulder integral with the supporting ring overcomes problems which would otherwise arise with a slave cylinder casing produced from plastics material, as the heating of the casing occurring during operation leads to a significant increase in diameter both of the internal wall and of the external wall. When using a supporting ring also consisting of plastics material, the thermal expansion does not cause problems in the pressure-free state. When the pressure chamber is loaded with pressure, however, the internal wall maintains its diameter whereas the diameter of the external wall increases. To enable the groove sealing ring to be protected from increased wear under these aggravated conditions, it is proposed according to the invention that the supporting ring be provided, at least in the region of its external periphery on the side facing the groove sealing ring, with an encircling supporting shoulder which engages in a corresponding recess on the rear of the groove sealing ring. This prevents the material of the groove sealing ring from travelling radially outwardly and penetrating the gap formed as a result of thermal expansion and pressure loading. Premature wear of the groove sealing ring in this region, as well as an increase in the frictional force at this point which would lead to an increase in wear, is thus prevented.

According to a further feature of the invention, it is advantageous also to provide an encircling supporting shoulder in the region of the internal periphery of the supporting ring. This supporting shoulder also protects the groove ring from the risk of being squeezed in the gap between supporting ring and internal wall at this point. A gap at this point may arise if, with high temperature and high pressure in the pressure chamber, the supporting ring increases radially in diameter owing to temperature but the external diameter of the internal wall of the housing cannot also expand radially outwardly according to its thermal expansion owing to the pressure loading.

According to the invention, a further method of avoiding wear on the guide members involves providing the supporting ring, in the region of its external periphery on the side facing the annular piston, with an encircling guide shoulder which engages in a concentric cavity of the annular piston for the radial guidance thereof. This guarantees perfect radial guidance of the annular piston so that the annular piston cannot rub on the internal wall or on the external wall of the casing. This is particularly important because the annular piston is preferably produced from reinforced plastics material for reasons of strength, the reinforcing contents not being particularly favourable to sliding. The supporting ring may be produced from material which is favourable to sliding so that it represents a perfect guide relative to the internal wall and the external wall whereas the annular piston is guided by the supporting ring and can have play relative to the two walls.

To improve the sliding properties between the groove sealing ring and the annular cylinder walls of the casing, it is proposed that a lubricant be introduced into an annular duct between the sealing lips and sealing beads provided on the groove sealing ring. To prevent this lubricant from being squeezed outwardly with pressure loading in the pressure chamber and therefore with compression of the groove sealing ring, it is therefore proposed that several supporting ribs which are distributed around the periphery, extend axially and extend between sealing lip and sealing bead be provided, these supporting ribs corresponding substantially to the nominal diameter of the internal and the external wall. The friction between the groove sealing ring and the casing may be reduced in this way and this in turn leads to low hysteresis during clutch actuation.

In designs in which the groove sealing ring does not have a sealing bead, in particular, it is proposed, for improving the sliding behaviour that one or more encircling lubricating grooves with a small radial depth in which a lubricant may be introduced prior to assembly, be provided at least in the region of the sealing lips. It is also perfectly possible also to arrange encircling lubricating grooves with a lubricant filling in the region of the groove sealing ring pointing from the sealing lips in the direction of the supporting plate.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIGS. 4 and 5 are enlarged sectional views through a supporting ring and an associated groove sealing ring.

DESCRIPTION OF PREFERRED EMBODIMENTS

Figure 1:
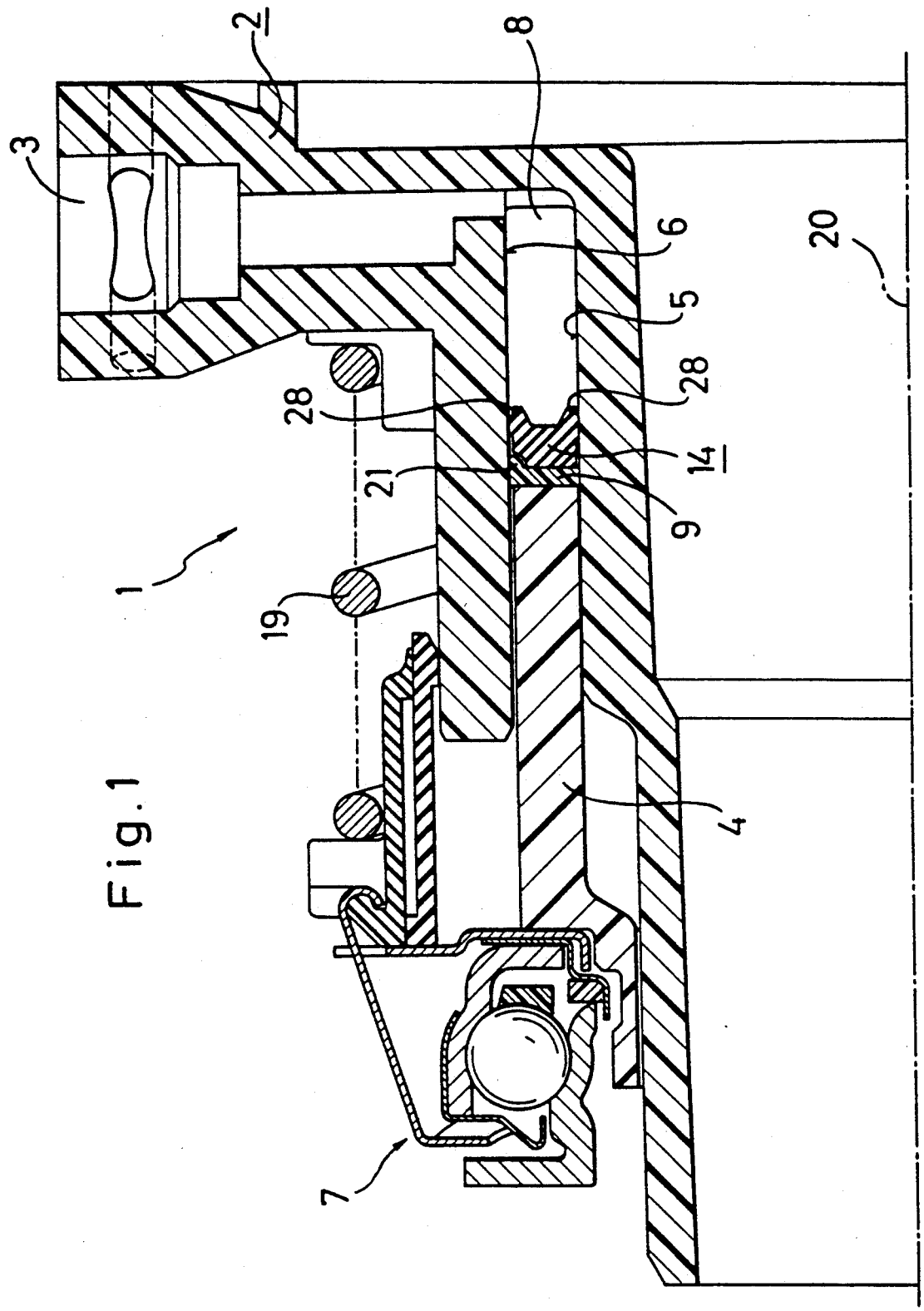
FIG. 1 is the upper half of a longitudinal section through a hydraulic releaser.

FIG. 1 shows a hydraulically actuated slave cylinder of a clutch releaser 1 which is arranged concentrically to a gear shaft (not shown), the gear shaft as well as the releaser 1 being arranged concentrically to an axis of rotation 20. The casing 2 of the releaser 1 is produced from plastics material by an injection moulding process so that machining is virtually unnecessary. The casing 2 has a connection 3 of a hydraulic line leading to a master cylinder (not shown) which may be loaded by a clutch pedal or an actuator. The casing 2 has an internal wall 5 and an external wall 6 which extend concentrically to the axis of rotation 20 and at a radial distance from one another. The two walls 5, 6 form the guide for an annular piston 4. The annular piston 4 and the two walls 5, 6 surround a pressure chamber 8 which communicates with the slave cylinder. The annular piston 4 has, in its end region projecting from the casing 2, a release bearing 7 which acts upon the release elements of the friction clutch (not shown). Concentrically to the axis of rotation 20 on a greater diameter there is arranged a biassing spring 19 which maintains permanent contact of the release bearing 7 on the release members of the friction clutch even in the absence of hydraulic loading of the annular piston 4. The pressure chamber 8 is sealed from the annular piston by a supporting ring 9 and a groove sealing ring 14.

The supporting ring 9 consists of a plastics material having properties which promote sliding and the groove sealing ring 14 is produced from an elastic material and has, in the direction of the pressure chamber 8, two encircling sealing lips 28 of which one rests radially outwardly on the external wall 6 and the other radially inwardly on the internal wall 5, more specifically in the unloaded state due to internal stress and with pressure loading via the pressure chamber 8 by the hydraulic actuating medium.

During operation of the motor vehicle equipped with the releaser 1, the region of the friction clutch experiences marked rises in temperature. These rises in temperature in conjunction with the varying pressure in the pressure chamber 8 are accompanied by problems of tolerance which can lead to unpleasant secondary effects, in particular between the supporting ring 9 and the two walls 5 and 6. On one side, the supporting ring 9 should be guided as far as possible without clearance on the two walls 5 and 6 to prevent the groove sealing ring 14 from penetrating the gaps relative to the walls 5 and 6 by elastic deformation with pressure loading in the pressure chamber 8. If this happens, the friction increases very markedly and the groove sealing ring 14 is very markedly deformed at least in the gap regions and tears at these points over time. When using plastics material having roughly the same coefficients of expansion for the supporting ring 9 and the casing 2, no problems with respect to tolerances could arise with regard to thermal expansion. However, if the hydraulic stress in the pressure chamber 8 is also applied, the conditions with respect to the internal wall 5 and the external wall 6 differ. The internal wall 5, for example, compensates the thermal expansion radially outwardly to a certain extent or completely due to pressure loading in the pressure chamber 8. With the external wall 6, the conditions are such that the pressure loading acts in the same direction in addition to the thermal expansion so that relatively great play variations can occur between the external wall 6 and the external diameter of the supporting ring 9.

Figure 2:
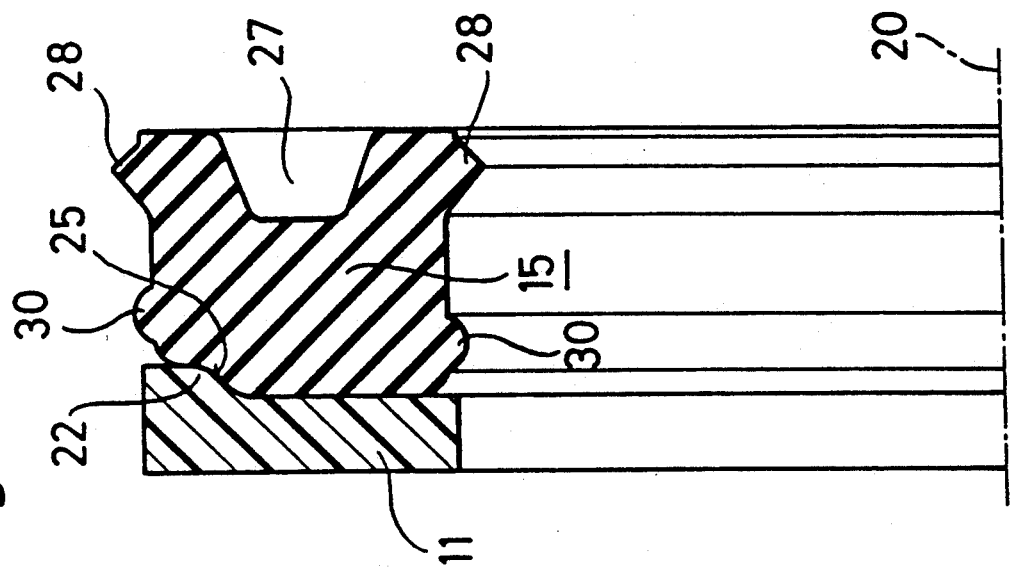
FIGS. 2 and 3 are enlarged sectional views through different groove sealing rings.
Figure 3:
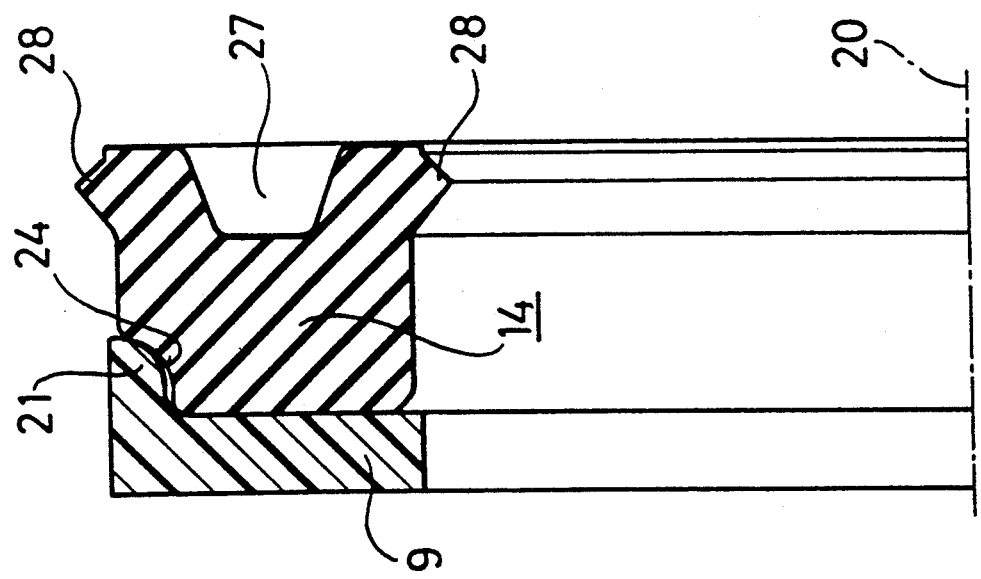

FIG. 2 shows the groove sealing ring 14 and FIG. 3 a variation in the form of a groove sealing ring in section and in an enlarged view, steps having being taken to avoid the risk, in particular at the external periphery of the corresponding supporting rings 9 and 11, that the groove sealing rings 14, 15 can penetrate the gaps forming owing to high pressure in the pressure chamber. In FIG. 2, the groove ring 14 is provided in a known manner with two encircling sealing lips 28 which are illustrated in the relaxed, unfitted position here. To improve the elasticity of these sealing lips there is provided a cavity 27 which is designed as an encircling groove. In the end region of the groove sealing ring 14 remote from the sealing lips 28 or the pressure chamber 8, the groove sealing ring has, at its radially outer edge, an encircling recess 24 in which the supporting ring 9 engages with a corresponding encircling supporting shoulder 21. This measure ensures that the groove sealing ring 14 consisting of elastic material cannot penetrate outwardly into the gap possibly formed between the external diameter of the supporting ring 9 and the external wall 6 of the casing 2 in the region of the recess 24 with pressure loading in the pressure chamber 8. The groove sealing ring 6 is thus protected from destruction at this point and increased friction cannot occur during clutch actuation. This also ensures that increased wear at the external wall 6 cannot occur in this region.

FIG. 3 shows a variation of FIG. 2 in which the groove sealing ring 15 has a respective sealing bead 30 in addition to the encircling sealing lips 28, more specifically in the regions axially remote from the sealing lips 28. Owing to the radially externally located sealing bead 30 and the space conditions which are therefore restricted on the supporting ring 11, there is formed a supporting shoulder 22 which is less deep in the axial direction than in FIG. 2. Despite this supporting shoulder which is axially flatter and is obviously also allocated a correspondingly axially flatter recess 25 in the groove ring 15, it is not possible for the groove ring 15 to penetrate into a small gap possibly formed between supporting ring 11 and internal bore 6 of the casing under pressure loading.

FIGS. 4 and 5 show the same section through a supporting ring 12 and a groove sealing ring 16 pertaining thereto respectively, the supporting ring 12 being provided in the present case with two encircling supporting shoulders 21 and 23 of which one extends in the region of the external wall 6 and the other in the region of the internal wall 5. The groove sealing ring 16 is consequently also designed with two recesses 24 and 26 of which the contours correspond to the supporting shoulders 21 and 23. This arrangement ensures that the groove sealing ring 16 cannot penetrate into a possible gap relative to the supporting ring 12 either in the region of the external wall 6 or in the region of the internal wall 5. The supporting ring 12 is also provided at its external periphery in the region facing the annular piston 4 with an encircling guide shoulder 31 into which the annular piston 4 is inserted with a corresponding cavity 35. In this way, the supporting ring 12 also radially guides the annular piston 4, in addition to its function of supporting the groove sealing ring 16, so the annular piston 4 may be inserted with play relative to the internal wall 5 and relative to the external wall 6 and freedom of contact therefore exists between the annular piston 4 and the casing 2 in all operating states. This measure also helps to prevent wear of the bores in the casing.

Figure 7:
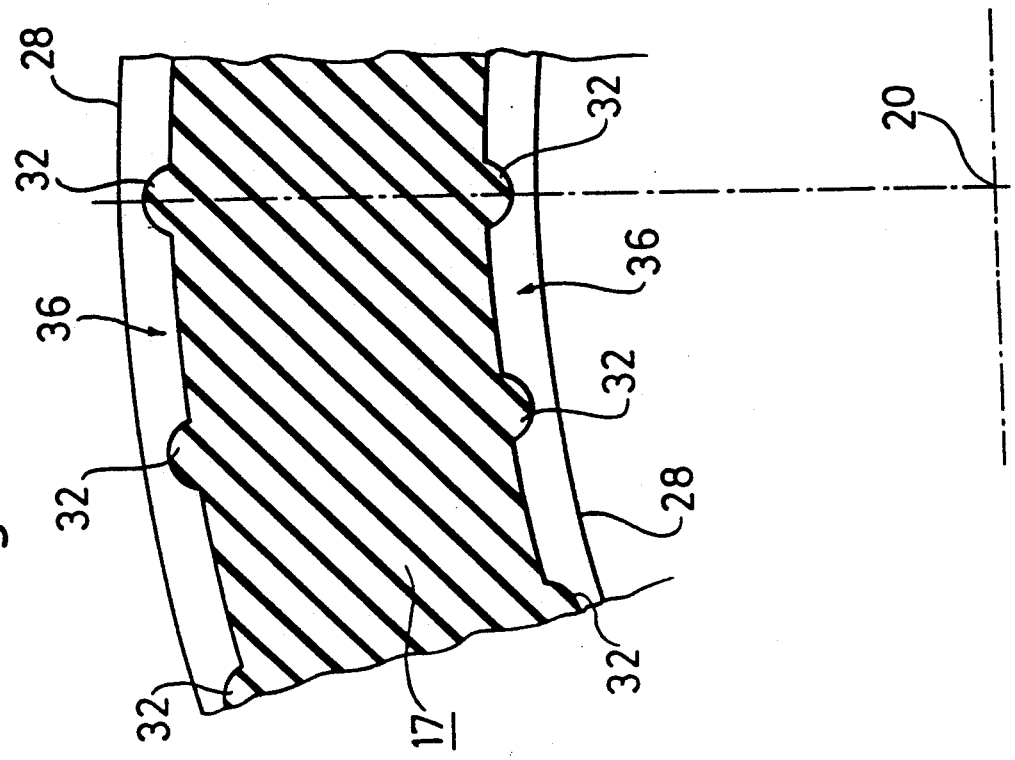
FIGS. 6 and 7 are a longitudinal and transverse section (line VII—VII in FIG. 6) through a groove sealing ring.
Figure 6:
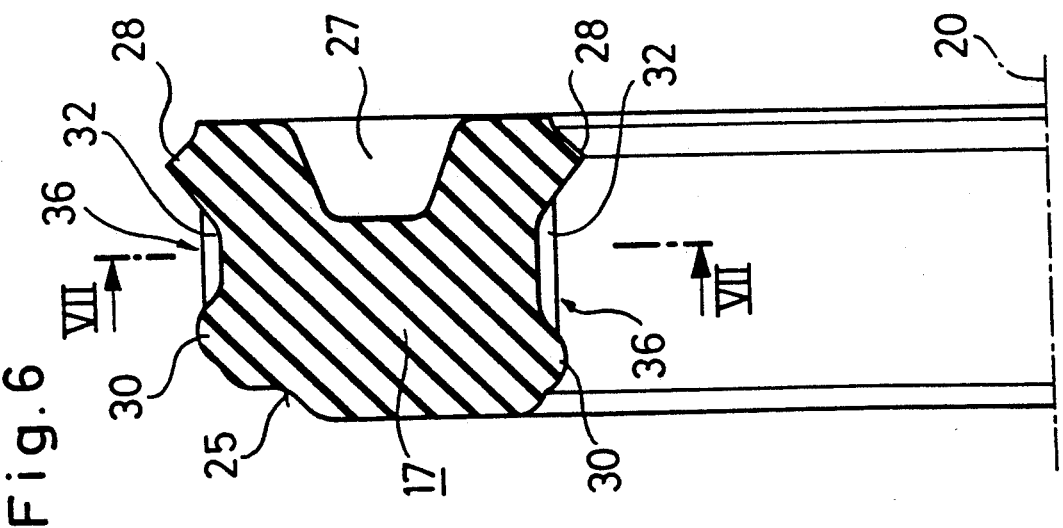

FIGS. 6 and 7 show a section through a groove sealing ring 17 in the longitudinal and transverse direction. In the groove sealing ring 17, the annular space 36 in the axial region between the sealing lips 28 and the sealing beads 30 is used to receive lubricant so that the friction between the groove sealing ring 17 and the walls 5 and 6 is clearly reduced. To prevent this annular space from being reduced or even eliminated by the pressure in the pressure chamber 8 due to elastic deformation of the groove sealing ring 17 and to enable the lubricant to pass outwardly, axially extending supporting ribs 32 of which the contact circle diameter corresponds substantially to the diameter of the walls 5 and 6 are distributed round the periphery. These supporting ribs 32 ensure that the lubricant introduced may also be held at the proposed point during operation.

Figure 8:
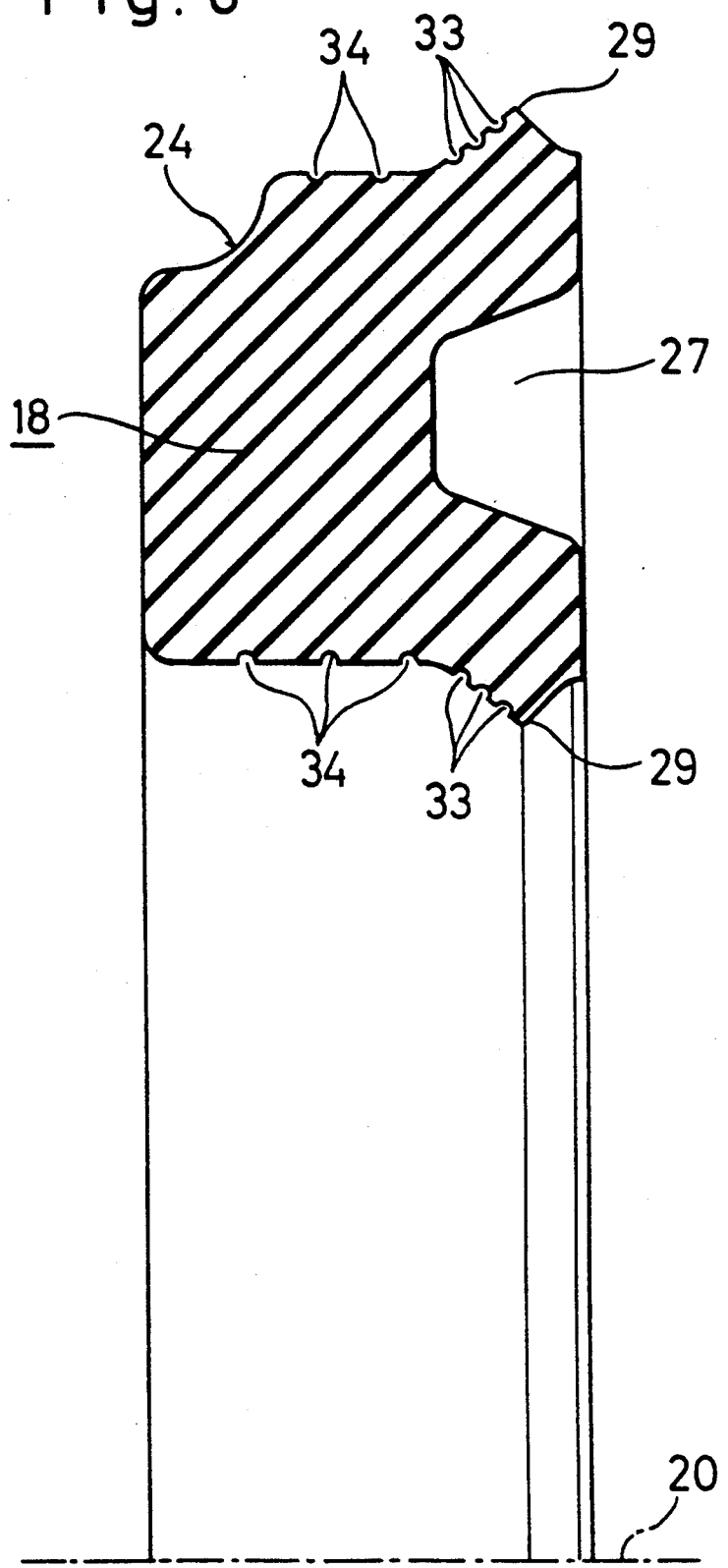
FIG. 8 is a section through a groove sealing ring with lubricating grooves.

FIG. 8 shows a groove sealing ring 18 which is provided with encircling sealing lips 29 in the known manner and with an encircling recess 24 at an axial distance from the radially outer sealing lip 29 for assembly with a supporting ring 9 according to FIG. 2. The sealing lips 29 have, in their region directed away from the pressure chamber 8, encircling lubricating grooves 33 which may be filled with a lubricant during assembly. The design of these lubricating grooves 33 with a small depth of penetration allows the lubricant to be retained even under load. Further lubricating grooves 34 which may also be guided with lubricant during assembly may additionally also be introduced in the cylindrical region of the groove sealing ring 18 between the sealing lips 29 and the end facing the supporting ring.

While specific embodiments of the invention have been shown and described in detail to illustrate the application of the inventive principles, it will be understood that the invention may be embodied otherwise without departing from such principles.

What we claim is:

1. A hydraulically actuable releaser for a motor vehicle friction clutch, comprising:

an annular cylindrical slave cylinder (1) having a casing (2) which comprises a pressure chamber (8) limited radially inwardly by an internal wall (5) and radially outwardly by an external wall (6) extending at a radial distance form the internal wall (5), the casing (2) including the internal wall (5), and the external wall (6) being made form plastic material;

an axially movable annular piston (4) extending between the internal wall (4) and the external wall (6);

a groove sealing ring (17) at an end of the annular piston (4) facing the pressure chamber (8), the groove sealing ring (17) having, on its side axially remote from the annular piston (4) in the region of its internal periphery and its external periphery, sealing lips (28) which enclose an annular groove (27) between themselves and which, for sealing the pressure chamber (8), rest on the internal wall (5) and the external wall (6), and the groove sealing ring (17) having, on its internal periphery an its external periphery on the side of the sealing lip (28) located toward the annular piston (4) a respective sealing bead (30) which, in the mounted state of the groove sealing ring (17), limits a lubricant receiving groove (36) disposed axially between the sealing bead (30) and the sealing lip (28) and extending int the peripheral direction;

a supporting ring (11) disposed axially between the annular piston (4) and the groove sealing ring (17), the supporting ring (11) having, on the side facing the groove sealing ring (17) in the region of the external periphery, an annular supporting shoulder (22) which projects to the groove sealing ring (17) and engages in a corresponding annular recess (25) on the side of the groove sealing ring (17) adjacent to the annular piston (4); and a release bearing (7) at an end of the annular piston (4) axially remote form the pressure chamber (8).

2. The release according to claim 1, wherein several supporting ribs (32) are disposed peripherally on the internal periphery and on the external periphery, axially between the sealing bead (30) and the sealing lip (28).

3. The release according to claim 2, wherein the diameter of the circle contact of the supporting ribs (32) is substantially equal to the nominal diameter of the internal wall (5) or of the external wall (6), respectively, in the unmounted state of the groove sealing ring (17).

4. A hydraulically actuable releaser for a motor vehicle friction clutch, comprising:

an annular cylindrical slave cylinder (1) having a casing (2) which comprises a pressure chamber (8) limited radially inwardly by an internal wall (5) and radially outwardly by an external wall (6) extending at a radial distance from the internal wall (5), the casing (2) including the internal wall (5), and the external wall (6) being made form plastic material;

an axially movable annular piston (4) extending between the internal wall (4) and the external wall (6);

a groove sealing ring (18) at an end of the annular piston (4) facing the pressure chamber (8), the groove sealing ring (18) having, on its side axially remote form the annular piston (4) in the region of its internal periphery and its external periphery, sealing lips (28) which enclose an annular groove (27) between themselves and which, for sealing the pressure chamber (8), rest on the internal wall (5) and the external wall (6), wherein the sealing lips of the groove sealing ring (18) have at least one encircling lubricant receiving groove (33) on the side toward the internal wall (5) and on the side toward the external wall (6);

a supporting ring (11) disposed axially between the annular piston (4) and the groove sealing ring (18), the supporting ring (11) having, on the side facing the groove sealing ring (18) in the region of the external periphery, an annular supporting shoulder (22) which projects to the groove sealing ring (18) and engages in a corresponding annular recess (25) on the side of the groove sealing ring (18) adjacent to the annular piston (4); and a release bearing (7) at an end of the annular piston (4) axially remote form the pressure chamber (8).

5. The releaser according to claim 4, wherein the groove sealing ring (18) has at least one further lubricant-receiving groove (34) axially between the annular piston (4) and the sealing lips (28) on the side toward the internal wall (5) and on the side toward the external wall (6).

6. The releaser according to claim 5, wherein the lubricant receiving groove or grooves (33, 34) have a smaller radial depth than the radial distance between the internal wall (5) and the external wall (6).

* * * * *

UNITED STATES PATENT AND TRADEMARK OFFICE
CERTIFICATE OF CORRECTION

PATENT NO. : 5,287,951
DATED : February 22, 1994
INVENTOR(S) : Herbert Voit et al.

It is certified that error appears in the above-identified patent and that said Letters Patent is hereby corrected as shown below:

```
Col. 5, line 14 , "casing" should read --casing 2--;
Col. 6, line 33 , "an its" should read --and its--;
Col. 6, line 40 , "int" should read --in--;
Col. 6, line 52 , "release" should read --releaser--;
Col. 6, line 56 , "release" should read --releaser--;
Col. 7, line 9 , "form" should read --from--.
```

Signed and Sealed this

Twenty-seventh Day of September, 1994

Attest:

BRUCE LEHMAN

*Attesting Officer*   *Commissioner of Patents and Trademarks*